US00RE37965E

(19) United States
(12) Reissued Patent
Jhingran et al.

(10) Patent Number: US RE37,965 E
(45) Date of Reissued Patent: Jan. 7, 2003

(54) METHOD FOR LOCALIZING EXECUTION OR SUBQUERIES AND DETERMINING COLLOCATION OF EXECUTION OF SUBQUERIES IN A PARALLEL DATABASE

(75) Inventors: Anant D. Jhingran, Elmsford, NY (US); Lubor J. Kollar, North York (CA); Timothy R. Malkemus, Round Rock, TX (US); Sriram K. Padmanabhan, Briarcliff Manor, NY (US)

(73) Assignee: International Business Machines Corporation, Armonk, NY (US)

(21) Appl. No.: 09/585,927

(22) Filed: Jun. 2, 2000

Related U.S. Patent Documents

Reissue of:
(64) Patent No.: 5,745,746
Issued: Apr. 28, 1998
Appl. No.: 08/672,013
Filed: Jun. 24, 1996

(51) Int. Cl.[7] ..... G06F 17/30
(52) U.S. Cl. ..... 707/2; 707/10
(58) Field of Search ..... 707/2, 10

(56) References Cited

U.S. PATENT DOCUMENTS 4,432,057 A 2/1984 Daniell et al.
4,769,772 A 9/1988 Dwyer
5,121,494 A * 6/1992 Dias et al.
5,165,018 A 11/1992 Simor
5,216,593 A 6/1993 Dietrich et al.
5,241,652 A 8/1993 Barabash et al.
5,276,870 A 1/1994 Shan et al.
5,287,493 A 2/1994 Jacopi
5,307,484 A 4/1994 Baker et al.
5,325,525 A 6/1994 Shan et al.
5,367,675 A 11/1994 Cheng et al.
5,446,886 A * 8/1995 Li
5,544,355 A * 8/1996 Chaudhuri et al.
5,548,755 A * 8/1996 Leung et al.
5,551,031 A * 8/1996 Cheng et al.
5,600,831 A * 2/1997 Levy et al.

* cited by examiner

*Primary Examiner*—Wayne Amsbury
(74) *Attorney, Agent, or Firm*—Ingrid M. Foerster

(57) ABSTRACT

A method for localizing execution of subqueries and determining collocation of execution of subqueries in a shared-nothing database. The concept of compatible partitioning is used to localize database operations in order to eliminate excess processes and communication, and thereby improve response time and throughput for the database management system. The method reduces the number of process by reducing the number of nodes involved in processing a query and by combining multiple processes.

13 Claims, 1 Drawing Sheet

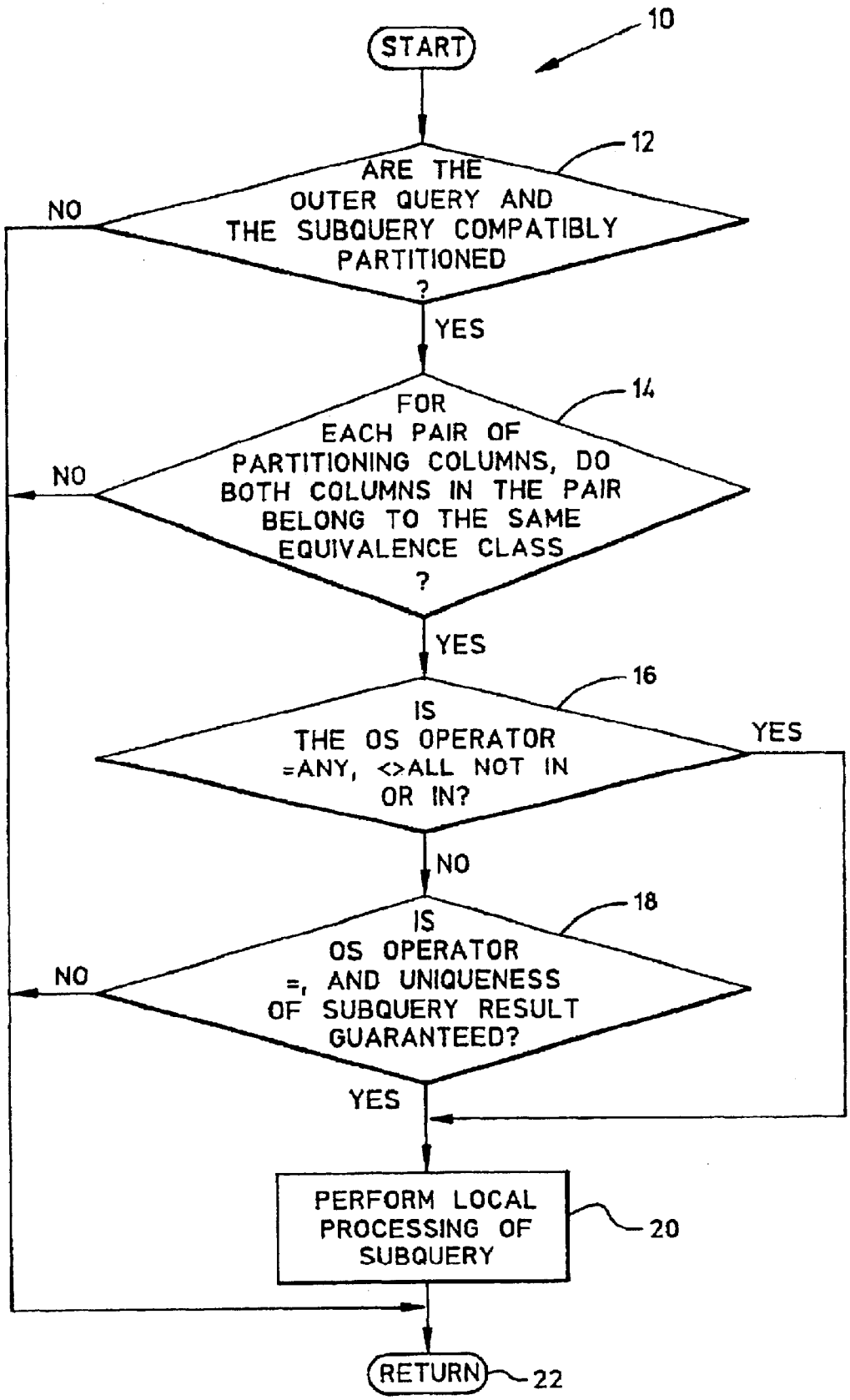
10
START
12
ARE THE OUTER QUERY AND THE SUBQUERY COMPATIBLY PARTITIONED ?
NO
YES
14
FOR EACH PAIR OF PARTITIONING COLUMNS, DO BOTH COLUMNS IN THE PAIR BELONG TO THE SAME EQUIVALENCE CLASS ?
NO
YES
16
IS THE OS OPERATOR =ANY, <>ALL NOT IN OR IN?
YES
NO
18
IS OS OPERATOR =, AND UNIQUENESS OF SUBQUERY RESULT GUARANTEED?
NO
YES
PERFORM LOCAL PROCESSING OF SUBQUERY
20
RETURN
22

METHOD FOR LOCALIZING EXECUTION OR SUBQUERIES AND DETERMINING COLLOCATION OF EXECUTION OF SUBQUERIES IN A PARALLEL DATABASE

Matter enclosed in heavy brackets [ ] appears in the original patent but forms no part of this reissue specification; matter printed in italics indicates the additions made by reissue.

FIELD OF THE INVENTION

This invention relates to parallel-processor database systems and more particularly to a method for localizing execution and determining collocation of execution of subqueries in a parallel database.

DESCRIPTION OF THE RELATED ART

A typical parallel processor computer system has a number of resources such as processors, memory buffers and the like. These resources can operate simultaneously, thereby greatly improving the performance of the computer when executing a task which has a number of sub-tasks that can be executed independently of each other.

Executing a sub-task usually involves executing a number of sub-tasks each of which in turn may have several parts. In a computer having only one processor, each step in executing each part of the sub-task is performed sequentially. In a parallel processor computer, several such operations can be performed simultaneously, but typically the parallel computer system does not have enough resources to go around. Resolving conflicting demands by the various sub-tasks for access to such resources has been a problem in the design of parallel processor computer systems, especially in the context of using such computer systems to evaluate complicated queries of a database.

Various kinds of parallel-processor database computer architectures have been proposed. Most of the proposed architectures for parallel-processor computers use a "shared-nothing" approach. A shared-nothing architecture comprises a collection of independent processors each having its own memory and disk and connected to the other processors via a high-speed communication network. In a shared-nothing database architecture, communication and synchronization overhead are critical factors in overall query performance. Shared-nothing systems are particularly well-suited to evaluate queries that can be partitioned into independent sub-problems, each of which is executed in parallel with the others.

There is a continuing need for a way to optimize query execution in a shared-nothing computer so as to make the most effective use of the various resources of the computer.

In shared-nothing database systems, the concept of "compatible partitioning" to localize database operations is a known technique to minimize inter-processor communication. For example, by partitioning tables t1 and t2 on t1.a and t2.a respectively, all communication can be avoided in computation of the JOIN "t1.a=t2.a". This result follows since a partition of t1 will only join with a partition of t2 on the same node.

There still remains a need for an efficient way to optimize subqueries in a multi-processor or parallel computer system, and particularly in a "shared-nothing" computer system.

SUMMARY OF THE INVENTION

The present invention provides a method for localizing execution and determining collocation of execution of subqueries in a parallel database. The method according to the present invention is suitable for both subqueries that involve correlation and subqueries that do not.

The method according to the present invention reduces the system resources needed for processing a query by reducing the number of processes used when a partitioning key of any table involved in the query is specified by an equality to a constant, host-variable, IN-list, or any internal run-time computation. The method reduces the number of processes: (1) by reducing the number of nodes involved in the query; or (2) by combining multiple processes into one.

The method according to the present invention also uses the concept of "compatible partitioning" in shared-nothing database systems to eliminate excess processing and communication for subqueries thereby improving response time and throughput.

In a first aspect, the present invention provides a method for determining locality for execution of subqueries for queries in a relational database management system, wherein said queries comprise an outer query and a subquery having a query-subquery operator and wherein partitioning columns for the query and subquery are provided, said method comprising the steps of: (a) determining if said outer query and said subquery are compatibly partitioned; (b) if said outer query and said subquery are compatibly partitioned then for each pair of partitioning columns in said outer query and said subquery determining an equivalence class for each of said columns in said pair; (c) determining if the partitioning column for said subquery belongs to the same equivalence class as the partitioning column for said outer query; (d) determining if said query-subquery operator comprises a selected operator; and and (e) if said steps (c) and (d) are true, then determining locality for said subquery so that said subquery is executable locally with respect to said outer query by the relational database management.

In a second aspect, the present invention provides a relational database management system for use with a computer system wherein queries are entered for retrieving data from tables and wherein partitioning columns and partitioning keys are provided, said system comprising: means for processing nested queries comprising an outer query and a subquery; means for determining locality of execution of said subquery including, (a) means for determining if said outer query and said subquery are compatibly partitioned; (b) means for determining an equivalence class for each column forming a corresponding pair of partitioning columns for said outer query and said subquery; (c) means for ascertaining if the partitioning column for said subquery belongs to the same equivalence class as the partitioning column for said outer query; (d) means for determining if said query-subquery operator comprises a selected operator; and (e) means responsive to said means for ascertaining and said means for determining said selected operator for determining locality of said subquery so that said subquery is locally executable with respect to said outer query by the relational database management system.

In a third aspect, the present invention provides a computer program product for use on a computer wherein queries are entered for retrieving data from tables, wherein said queries comprise an outer query and a subquery having a query-subquery operator and wherein partitioning columns for the query and subquery are provided, said computer program product comprising: a recording medium; means recorded on said medium for instructing said computer to perform the steps of, (a) determining if said outer query and said subquery are compatibly partitioned; (b) if said outer query and said subquery are compatibly partitioned then for each pair of partitioning columns in said outer query and said subquery determining an equivalence class for each of said columns in said pair; (c) determining if the partitioning column for said subquery belongs to the same equivalence class as the partitioning column for said outer query; (d) determining if said query-subquery operator comprises a selected operator; and (e) if said steps (c) and (d) are true, then determining locality for said subquery so that said subquery is locally executable with respect to said outer query by the relational database management.

BRIEF DESCRIPTION OF THE DRAWINGS

Reference will now be made, by way of example, to the accompanying drawing which shows a preferred embodiment of the present invention, and in which:

The FIGURE is a flow chart of a method for determining locality for execution of subqueries according to the present invention.

DETAILED DESCRIPTION OF THE PREFERRED EMBODIMENT

A database management system (DBMS) is a system for accepting commands to store, retrieve, and delete data. A widely used and well known set of commands for use with DBMS is the Structured Query Language (SQL). A simple example of a SQL query is:

EXAMPLE 1:

```
SELECT column x
FROM table t1
WHERE column y='employee'
```

The query shown in Example 1 requests that the DBMS retrieve all column x fields from tuples in table t1 which have column y equal to 'employee'. In practical applications, the query can become quite complex. Multiple tables and multiple columns can be referenced. (In order to distinguish which column of which table is being referenced column x of table t1 may be written as t1.x).

One of the most powerful features of SQL is the capability of nesting SQL query expressions within the predicate in the WHERE clause. Nested SQL queries are called subqueries. With subqueries, one can compare the column expression of a query to the column expression of another query. One can also compare column expressions with subqueries whose result is a table, either by testing membership, testing if ANY row of the table has a property, or testing if ALL do. Often a query is formulated by using a subquery in the predicate. For example, to find all the employees who earn more than the average salary of the entire organization, one may write:

EXAMPLE 2:

```
SELECT name FROM employee e
WHERE salary>(SELECT avg(salary) FROM employee
  e1)
```

The query shown in Example 2 illustrates a non-correlated subquery. An example of a correlated subquery is provided below in Example 3.

EXAMPLE 3:

```
SELECT name FROM employee e
WHERE salary>(SELECT avg(salary) FROM employee
  e1 WHERE e1.dept=e.dept)
```

The query shown in Example 3 determines the names of employees who earn more than the average salary of their department.

The implementation of a subquery according to the art involves setting up processes to evaluate the subqueries, e.g. "SELECT avg(salary) . . . ", and setting up communication paths between the subquery processes and the outer query, e.g. "SELECT name FROM employee e WHERE> . . . ". The result of a query (and subquery) execution is a table, and the communication path is needed for the subquery result. For correlated subqueries, an additional path is needed in order to send the correlated values. An example of a correlated subquery is "SELECT avg(salary) FROM employee e1 WHERE e1.dept=e.dept" . . . as shown above in Example 3.

The method according to the present invention utilizes compatible partitioning to localize database operations for subqueries. The method leads to fewer processes and less communication. The fewer processes ease the demand on system resources, and less communication improves response time and throughput for the DBMS.

Reference is made to the accompanying FIGURE which shows in flow chart form an overview of a method 10 according to the present invention. The present invention is described with reference to a shared-nothing database, however, the invention has wider applicability to other parallel database architectures.

An SQL command comprising an outer query and a subquery is entered to retrieve information from a database. The command is processed by the database management system (DBMS) on a database processing machine. In known manner, the command statement is parsed and the semantics of the statement are checked for compliance with grammatical/semantic rules, and then an internal representation of the command is made for the system to process the command. In one form of the invention, a method is provided to determine if the subquery can be executed locally with respect to the outer query, in order to improve the processing of the query for retrieving data quickly. Improvements relate to improved response time and throughput by reducing system resources needed for execution of query and communication paths (between the subquery and the outer query). For a subquery executed locally according to the method of the present invention, the result of the subquery execution will have the same partitioning as both the input outer query and the input subquery. An additional improvement is achieved because the method may be recursively applied to other query-subquery tuples.

A first step 12 in the method 10 involves determining if the outer query and the inner query are "compatibly partitioned". According to step 12 of the method, the outer query and inner query are compatibly partitioned if they use the same "Partitioning Algorithm". A Partitioning Algorithm is an algorithm which unambiguously identifies a single partition by considering only the column values of a given row in a table. The smallest subset of such column values is known as the "Partitioning Key" of the table, and the columns in the subset are known as the "Partitioning Columns" of the table. If a Partitioning Algorithm exists for a table, then the table is "Deterministically Partitioned". (The result of a query execution (and a subquery execution) is a table.) If a Partitioning Algorithm does not exist for a table, then the table is not Deterministically Partitioned. Query and subquery partitioning according to the method of the present invention involves considering the Partitioning Algorithm, i.e. Partitioning Columns, for the resulting tables.

In other words, compatible partitioning means that any matching tuple of t1 (i.e. resulting table for the executed query) on the clause t1.a=t2.a will occur on the same node as the tuple of t2 (i.e. the resulting table for the executed subquery). The utilization of compatible partitioning according to the present method is shown by the following example.

EXAMPLE 4:

If tables t1 and t2 are partitioned on t1.a and t2.a respectively, then the subquery.col SELECT * FROM t1
WHERE t1.a IN
(SELECT a FROM t2)

can be evaluated by comparing t1.a with only the t2.b values on that node.

If the outer query and the subquery are compatibly partitioned, i.e. they utilize the same Partitioning Algorithm, then the method 10 proceeds next to steps 14 and 16 to determine if the subquery is locally executable.

In steps 14 and 16, the method 10 determines if each corresponding pair of Partitioning Columns satisfies two conditions. (In the following description, a corresponding pair of Partitioning Columns refers to columns which correspond to the order of Partitioning Columns according to the partitioning keys of the outer query and the subquery.) The first condition is tested in step 14 and involves determining if both columns in the pair belong to the same Query-Subquery (QS) Equivalence Class. The second condition is tested in step 16 and involves determining if the Query-Subquery (QS) operator comprises one of the four operators: "=ANY, ◇ALL, NOT IN or IN". If the outer query and subquery are compatibly partitioned (step 12) and the two conditions (step 14 and 16) are satisfied, then according to the method of the present invention the subquery is processed or evaluated by the DBMS entirely locally in step 20 with respect to the outer query.

For step 14 of the method, the QS Equivalence Class is the list of columns each of which belong to any of the base tables (or derived tables) belonging to the Query-Subquery. Two columns c1,c2 belong to the same QS Equivalence Class, if there exists a Boolean Factor c1=c2 in either the query predicate or the subquery predicate. The method according to the present invention uses the column equivalence class to establish a one-to-one pairing between the partitioning columns of the query and the partitioning columns of the subquery. If there is a one-to-one pairing, then the subquery is executable locally with respect to the outer query as shown in step 20.

The method is also suitable for cases where the order of partitioning columns in the partitioning key is not significant. In such a case, the method may consider more partitioning columns of the subquery for pairing with a single partitioning column of the outer query and vice versa. To guarantee locality of execution of the subquery with respect to the outer query, the method needs to establish any one-to-one pairing between the partitioning columns of the outer query and the partitioning columns of the subquery, where each pair satisfies the two conditions.

The second condition applied in step 16 of the method 10 involves determining if the outer query's column participates in a query-subquery predicate and the subquery's column participates in the SELECT list of the subquery in such a form, that only the equal values of the two columns need to be investigated to conclude validity of the predicate. In the case of a query-subquery which does not comprise a QS operator of the four "=ANY, ◇ALL, NOT IN or IN", it is still possible to execute the subquery locally if uniqueness in the subquery result can be guaranteed. As shown in the FIGURE, if the second condition in step 16 is not satisfied, i.e. the QS operator does not comprise=ANY, ◇ALL, NOT IN or IN, the method 10 moves to step 18. In step 18, the method 10 checks if the QS operator is "=" and then determines if the locality of the subquery result can be guaranteed. If the outcome of step 18 is TRUE, then according to the invention the subquery is locally executable in step 20. One method for determining uniqueness is by considering if any unique key on the subquery result (i.e. table) is specified by equality to a constant, hostvar or other construct. The operation of this aspect of the method is shown by the following example:

EXAMPLE 5:

SELECT * FROM t1
WHERE a=(SELECT a FROM t2 WHERE t2.c=300)

Given t2.c is a unique key on table t2

According to the present method, the unique key t2.c is recognized as guaranteeing the uniqueness of the subquery result and therefore the subquery is executed locally with respect to the outer query. On the other hand, if the "elect list" for the subquery is not a simple column or constant, for example SELECT * FROM t1 WHERE a IN (SELECT avg(b) FROM t2), the method cannot guarantee uniqueness of the subquery result and therefore the subquery is not executed locally.

The operation of the method 10 according to the present invention is illustrated for a non-correlated subquery. A non-correlated subquery is evaluated entirely locally if the following conditions are satisfied: (1) the QS operand and the subquery result are "compatibly partitioned" and belong to the same equivalence class; and (2) the QS operator is one of four=ANY, ◇ALL, NOT IN or IN. The method determines compatible partitioning (step 12 in the FIGURE) using a test similar to that used for determining compatibly partitioning for joins, e.g. T1.a=T2.a. The following example illustrates a non-correlated subquery.

EXAMPLE 6:

SELECT * FROM t1.a
WHERE t1.a IN (SELECT a FROM t2)

and given t1 and t2 are partitioned on t1.a and t2.a

For a non-correlated subquery, the method first determines if the QS operand, i.e. t1.a, and the subquery result, i.e. SELECT a from t2, are compatibly partitioned (step 12 in the FIGURE). The next step in the method involves determining if the QS operand is=ANY, ◇ANY, NOT IN or IN (step 16 in the FIGURE). Given that t1 and t2 are partitioned on t1.a and t2.a and the QS operand is "IN", then according to the method 10 the subquery is evaluated locally by comparing the t1.a value with only the t2.b values on that node. Evaluating the subquery locally improves the response time and throughput for the DBMS because fewer system resources and communication are needed.

The method is also suitable for subquery having more than one table provided the subquery result is compatibly partitioned with the QS operand. For example, the following subquery includes another table t3 which is partitioned on t3.a:

EXAMPLE 7:

SELECT * FROM t1
WHERE t1.a ◇ALL
(SELECT t2.a FROM t2,t3 WHERE t2.a=t3.a)

According to the method, the subquery in Example 7 is evaluated fully locally.

The operation of the method according to the present invention for a correlated subquery is shown for the following example query.

EXAMPLE 8:

SELECT * FROM t1
WHERE a IN (SELECT b FROM t2 WHERE t2.a=t1.a)

The method first checks the correlation values connecting the outer query block to the subquery block. For the query of Example 8, the subquery block has a correlation value of t1.a and the method determines that because of the correlation value, i.e. t1.a, for the subquery, the values of the outer query, i.e. SELECT * FROM t1, will only match those values of t2.b which come from the same node. Therefore, according to the method the subquery block is executable locally.

If the correlation values do not guarantee locality, then the method proceeds as described above for a non-correlated subquery, i.e. the method connects the QS operand, IN, NOT IN,=ANY or ◇ ALL predicate, with the subquery result. The operation of this aspect of the present method is shown by the following example:

EXAMPLE 9:

```
SELECT * FROM t1
  WHERE a IN (SELECT a FROM t2 WHERE t2.b=
    t1.a)
```

In the above example, the method determines if the correlation value, i.e. t1.a, for the subquery block guarantees locality. For this example, the correlation value t1.a does not guarantee locality, i.e. matches will not all come from the same node, and the method proceeds as for a non-correlated subquery described above. According to the method of the present invention, the QS predicate, i.e. IN, NOT IN, ◇ ANY,=ANY, guarantees locality and the subquery is executable locally with respect to the outer query.

It is another feature of the present method that if the subquery can be executed locally with respect to the outer query, then the result of the execution and application of the subquery produces a new query with the same partitioning as both the original outer query and the subquery. This means that the steps described above can be applied recursively to other query-subquery tuples.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

We claim:

1. A method for determining locality for execution of subqueries for queries in a relational database management system, wherein said queries comprise an outer query and a subquery having a query-subquery operator and wherein partitioning columns for the query and subquery are provided, said method comprising the steps of:

(a) determining if said outer query and said subquery are compatibly partitioned;

(b) if said outer query and said subquery are compatibly partitioned then for each pair of partitioning columns in said outer query and said subquery determining an equivalence class for each of said columns in said pair;

(c) determining if the partitioning column for said subquery belongs to the same equivalence class as the partitioning column for said outer query;

(d) determining if said query-subquery operator comprises a selected operator; and (e) if said steps (c) and (d) are true, determining locality for said subquery so that said subquery is locally executable with respect to said outer query by the relational database management.

2. The method as claimed in claim 1, wherein said step (d) comprises checking if said selected operator is the=operator and determining if a correlation value connecting said outer query to said subquery guarantees localized execution of the said subquery with respect to said outer query.

3. The method as claimed in claim 2, wherein said step (c) comprises determining if a column for said outer query will match on values of a column for said subquery and which come from a same node.

4. The method as claimed in claim 1, wherein said selected operator belongs to a group of operators comprising=ANY, ◇ ALL, NOT IN or IN.

5. The method as claimed in claim 1, wherein said step (c) comprises determining if a partitioning key for said subquery is specified by a construct.

6. The method as claimed in claim 4, wherein said construct comprises a constant.

7. The method as claimed in claim 4, wherein said construct comprises a HOSTVAR.

8. A method for determining locality for execution of subqueries in queries in a relational database management system, wherein said queries comprise an outer query and a subquery having a query-subquery operator and wherein partitioning columns for the query and subquery are provided, said method comprising the steps of:

(a) determining if said outer query and said subquery are compatibly partitioned;

(b) if said outer query and said subquery are compatibly partitioned then for each pair of partitioning columns in said outer query and said subquery determining an equivalence class for each of said columns in said pair;

(c) determining if the partitioning column for said subquery belongs to the same equivalence class as the partitioning column for said outer query;

(d) determining if said query-subquery operator belongs to a group of operators comprising=ANY, ◇ ALL, NOT IN or IN; and (e) if said steps (c) and (d) are true, then concluding locality for execution of said subquery so that said subquery is executable locally with respect to said outer query by the relational database management system.

9. A relational database management system for use with a computer system wherein queries are entered for retrieving data from tables and wherein partitioning columns and partitioning keys are provided, said system comprising:

means for processing nested queries comprising an outer query and a subquery;

means for determining locality of execution of said subquery including, (a) means for determining if said outer query and said subquery are compatibly partitioned;

(b) means for determining an equivalence class for each column forming a corresponding pair of partitioning columns for said outer query and said subquery;

(c) means for ascertaining if the partitioning column for said subquery belongs to the same equivalence class as the partitioning column for said outer query;

(d) means for determining if said query-subquery operator comprises a selected operator; and (e) means responsive to said means for ascertaining and said means for determining said selected operator for determining locality of said subquery so that said subquery is locally executable with respect to said outer query by the relational database management system.

10. The system as claimed in claim 9, wherein said means for determining said query-subquery is responsive to a query-subquery operator belonging to a group of operators comprising=ANY, ◇ ALL, NOT IN or IN.

11. A computer program product for use on a computer wherein queries are entered for retrieving data from tables, wherein said queries comprise an outer query and a subquery having a query-subquery operator and wherein partitioning columns for the query and subquery are provided, said computer program product comprising:

a recording medium;

means recorded on said medium for instructing said computer to perform the steps of, (a) determining if said outer query and said subquery are compatibly partitioned;

(b) if said outer query and said subquery are compatibly partitioned then for each pair of partitioning columns in said outer query and said subquery determining an equivalence class for each of said columns in said pair;

(c) determining if the partitioning column for said subquery belongs to the same equivalence class as the partitioning column for said outer query;

(d) determining if said query-subquery operator comprises a selected operator; and (e) if said steps (c) and (d) are true, then determining locality for said subquery so that said subquery is locally executable with respect to said outer query by the relational database management.

12. The computer program product as claimed in claim 11, wherein step (d) comprises determining if a correlation value connecting said outer query to said subquery guarantees localized execution of said subquery with respect to said outer query.

13. The computer program product as claimed in claim 11, wherein said selected operator belongs to a group of operators comprising=ANY, ◇ALL, NOT IN or IN.

* * * * *

UNITED STATES PATENT AND TRADEMARK OFFICE

CERTIFICATE OF CORRECTION

PATENT NO. : RE 37,965 E
APPLICATION NO. : 09/585927
DATED : January 7, 2003
INVENTOR(S) : Anant D. Jhingran et al.

It is certified that error appears in the above-identified patent and that said Letters Patent is hereby corrected as shown below:

On page 1, column 1, after the line, "Filed: Jun. 24, 1996", insert

-- (30) Foreign Application Priority Data

Sept. 27, 1995 (CA) ……...2159270 --

In the claims:

Column 8:

In claim 6, delete "4" and insert -- 5 --

In claim 7, delete "4" and insert -- 5 --

Signed and Sealed this

Third Day of October, 2006

JON W. DUDAS
*Director of the United States Patent and Trademark Office*